United States Patent [19]
Michalik et al.

[11] 3,883,339
[45] May 13, 1975

[54] METHOD OF TWO STAGE TEMPERING OF GLASS

[75] Inventors: Edmund R. Michalik, West Mifflin; James E. Neely, Jr., Butler, both of Pa.

[73] Assignee: PPG Industries, Inc., Pittsburgh, Pa.

[22] Filed: May 7, 1974

[21] Appl. No.: 467,767

[52] U.S. Cl. .................... 65/114; 65/104; 65/115
[51] Int. Cl. ........................................... C03b 27/00
[58] Field of Search ............. 65/104, 114, 115, 116, 65/348, 349, 350, 351

[56] References Cited
UNITED STATES PATENTS

| | | | |
|---|---|---|---|
| 2,131,406 | 9/1938 | Mosmieri et al. | 65/349 |
| 2,401,442 | 6/1946 | Weihs | 65/115 |
| 3,393,062 | 7/1968 | Hesten et al. | 65/104 X |
| 3,595,725 | 7/1971 | Coen | 65/104 X |
| 3,764,403 | 10/1973 | Neely, Jr. | 65/114 X |

FOREIGN PATENTS OR APPLICATIONS

| | | | |
|---|---|---|---|
| 541,049 | 11/1941 | United Kingdom | 65/114 |

*Primary Examiner*—Arthur D. Kellogg
*Attorney, Agent, or Firm*—Edward I. Mates; Thomas F. Shanahan

[57] ABSTRACT

Tempering glass sheets by a cooling process comprising using a sublimable cooling medium and air either as a mixture where air blasts mixed with soft solid particles of sublimable material move toward the glass surface or by a multiple stage cooling process using the sublimable solid in the initial cooling stage only for sufficient time to establish a temper and then additionally cooling with a second, less expensive cooling medium such as air.

7 Claims, 5 Drawing Figures

3,883,339
SHEET 3 OF 3
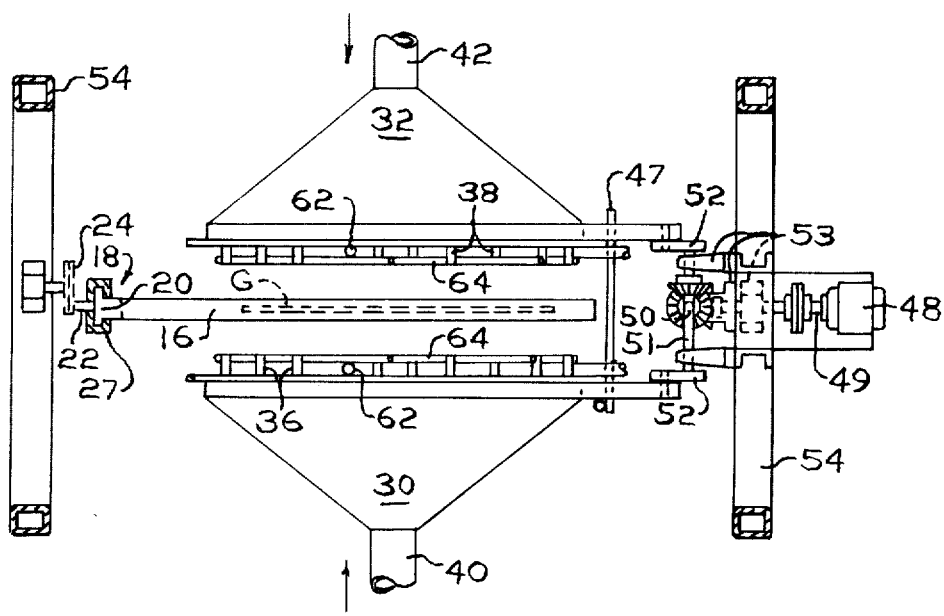
FIG. 3
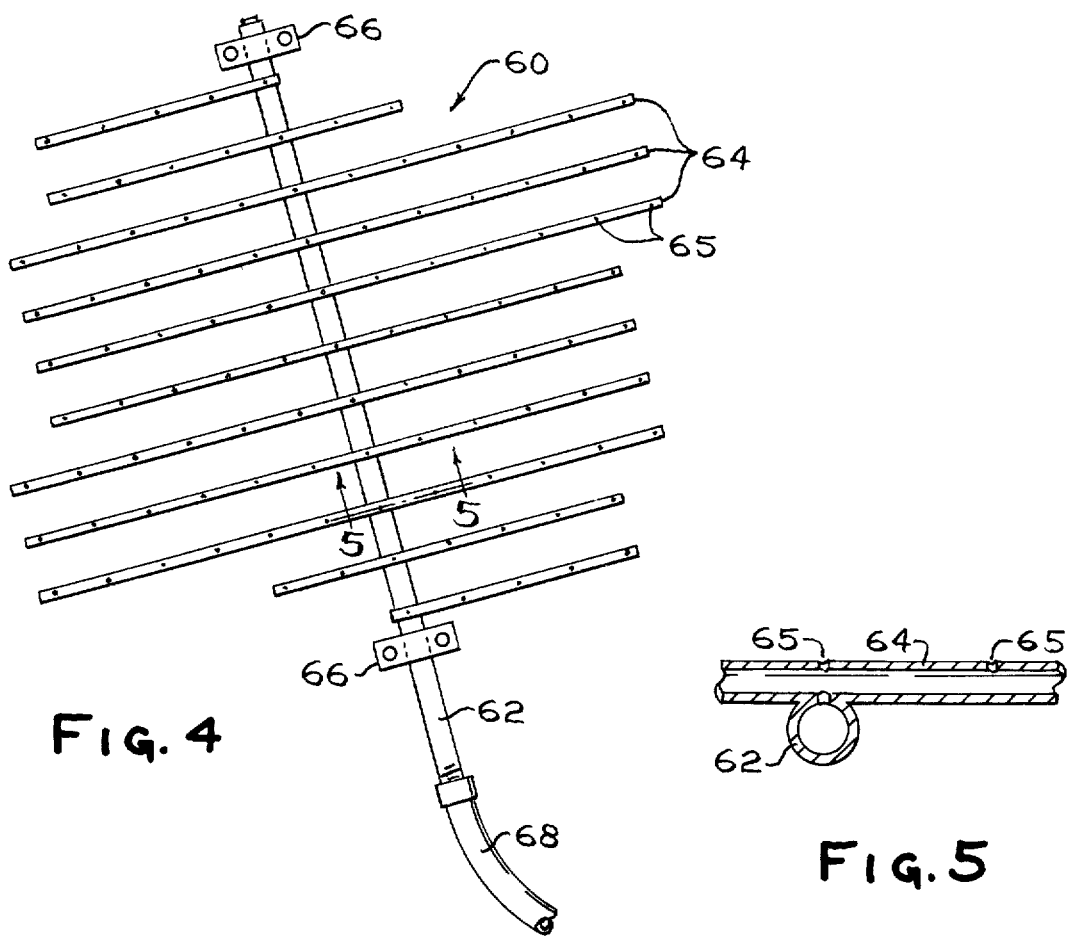
FIG. 4
FIG. 5

METHOD OF TWO STAGE TEMPERING OF GLASS

BACKGROUND OF THE INVENTION

This invention relates to tempering glass sheets, and particularly relates to novel methods of tempering glass sheets using a sublimable composition such as soft, solid carbon dioxide particles in the form of snow. The snow may be mixed with air blasts or may be used exclusively in the initial cooling stage of a multiple stage tempering process only to chill glass sufficiently rapidly to impart a temper thereto, with additional cooling provided by a second, less expensive cooling composition. While the details of the invention will be described in connection with glass sheet tempering, it is understood that other materials such as metals, metal alloys, plastics and glass fibers may also be chilled according to the teachings of the multiple stage cooling process of the present invention.

The present invention has utility especially for tempering glass sheets having a nominal thickness of approximately 2 mm to 3 mm (3/32 inch to ⅛ inch) for use in laminated and monolithic windows for automobiles, aircraft and marine vehicles. However, the principles of this invention are also applicable for use in tempering glass sheets of other thicknesses.

DESCRIPTION OF THE PRIOR ART

Glass sheets are thermally tempered by heating them to an elevated temperature above the glass strain point and approaching the glass softening point, and then suddenly chilling the glass to cool the glass surface regions relatively rapidly while the inner regions of the glass cool at a slower rate. The differential cooling throughout the glass thickness develops a compressive stress in the glass surface regions which is balanced by a tension stress in the interior of the glass. The resultant tempered glass has a much greater resistance to fracture than untempered glass. Also, in the less frequent times that tempered glass does fracture, its breakage pattern is significantly different from that of untempered glass, because glass shatters into small fragments having blunt round edges which become smaller and more rounded as temper increases, whereas untempered glass fractures to form large pieces having sharp edges. This safe breakage pattern and lesser tendency to fracture makes tempered glass more desirable for use in many articles such as transparent doors, motor vehicle closures, ophthalmic lenses, covers for instrument panels, containers, and the like.

Traditionally, glass has been thermally tempered by impinging blasts of cool air on the surface of heated glass articles. This technique is limited for practical use for tempering relatively thick glass, but not completely acceptable for tempering thinner glass articles. Air has relatively low heat transfer capacity characteristics. Therefore, it does not remove heat away from the surface of the glass quickly enough to set up a sufficient differential cooling pattern between the surface regions and the interior regions of relatively thin glass articles to impose an adequate temper. As a result, only relatively low degrees of temper can be obtained when air is used exclusively to temper thin glass articles.

Strengthening by chemical means, also called chemical tempering, though somewhat newer than the art of thermal tempering, is also well known. There are several mechanisms by which it may be accomplished. One of these entails ion exchange in the surface layers of the glass at a temperature approaching the strain point of the glass. In the ion exchange, relatively small ions, such as sodium, are replaced by larger ions, such as potassium, or smaller ions, such as lithium, are replaced by larger ions, such as sodium and/or potassium. The crowding of the larger ions into the spaces left by removal of the smaller ions produces a compression of the surface layers. Two other mechanisms for chemical tempering entail either ion exchange or partial crystallization, or both, at elevated temperatures, in such a manner that the modified surface layers of glass have a lower coefficient of expansion than the base glass. When an article thus treated is cooled to room temperature, the differential contraction of the surface and interior layers again produces compressive stresses in the surface.

After treating the glass composition as recited in the chemical tempering operations described above, the chemical nature of the alkali metal oxide constituents of the surface zone of the glass article is altered radically with replacement of lithium by sodium and/or potassium, or of sodium by potassium, depending upon the initial glass composition. At the same time the central interior regions of the glass article contain substantially the same concentration of alkali metal as before the treatment.

At lower temperatures the effect of such contact with a molten metal salt is much slower with the result that chemically tempered glass articles are difficult to achieve within the periods of time which are commercially practicable. For example, an immersion of soda-lime-silica glass for 1 hour in molten potassium nitrate at about 371°C. (700°F.) does not improve the strength properties of the glass substantially. Much longer periods of immersion at this temperature are required to produce strength compressibility like that achieved in the minimal time periods (5 to 10 minutes) at higher temperatures. At temperatures exceeding about 466°C. (870°F.), the desired strength improvement occurs even more rapidly. However, even the most rapid chemical tempering treatments presently known require too much time to enable one to temper glass chemically by a continuous flow process. Chemical tempering requires the collection of a batch of glass sheets and the simultaneous chemical treatment of the glass sheets in batches.

The depth or thickness of the surface zone of compression depends upon the temperature and duration of the chemical tempering treatment. Since diffusion is a relatively slow process, the effects of chemical tempering do not penetrate very deeply into the glass. This is reflected in the stress distribution in chemically tempered glass. In such glass, the compressive stress ranges from a relatively high level at the surfaces to zero at the depth of only a few thousandths of an inch below the surface. The rest of the interior of the glass sustains only a very low tensile stress, required to balance the compressive forces in the very thin layers near the surfaces. Thus, it may be seen that chemically tempered glass having the same surface compressive stress as thermally tempered glass may have much less interior tension stress and very much lower specific strain energy. Thus, while its strength in the absence of gross surface abrasions may be the same as that of thermally tempered glass, it does not have the same propensity to disintegrate when broken. It is usually considered a disadvantage in automotive applications where the small size of fragments is as important as the enhancement of strength.

Comparing thermally and chemically tempered glass, the former has the advantage that the greater thickness of the compressive layers on its surface gives it more abrasion resistance. Therefore, thermally tempered glass is superior to chemically tempered glass for use in installations where the glass will be exposed to abrasion. Abrasion wears away the surface portion facing the source of abrasion. Since chemically tempered glass has a thin layer of compression stress compared to thermally tempered glass, abrasion can remove the compression stress zone that gives chemically tempered glass its superior properties of tempered glass more rapidly and readily than the relatively thick compressive stress zone of thermally tempered glass.

The prior art has also suggested the use of liquids instead of air as the cooling medium for thermal tempering. Liquids have higher heat transfer characteristics than air and therefore, are capable of removing heat much more rapidly from the glass surface than air does. This more rapid cooling produces a greater temperature differential between the interior and the surface of the glass cooled, thereby creating a potential to produce a higher degree of temper in the glass than is possible from air tempering. The technique of using liquids to chill glass to impart a thermal temper to the glass is generally referred to in the art as liquid quenching.

Various techniques have been developed to contact the glass surface with liquid. The quenching liquid may be atomized and sprayed on the surface of the glass. Such a technique is well known in the metal tempering art and is disclosed in U.S. Pat. No. 3,208,742. Another method of contacting the glass with liquid is to immerse the glass completely in the quenching liquid. This technique is known as immersion quenching or dip quenching and is described in U.S. Pat. Nos. 170,339; 2,145,110; 2,198,729; 3,186,816; 3,271,207; and Belgium Pat. No. 729,055.

In conducting the method for thermally tempering glass by liquid quenching, glass is first heated to a very high temperature, usually somewhere near the softening point of the particular glass being tempered. The softening point, as used herein, is that condition in which glass has a viscosity of $10^{7.6}$ poises. The temperature at the softening point of the glass will vary depending on the particular composition of the glass. For example, in a soda-lime-silica glass composition, the temperature at the softening point is about 760°C. (1400°F.). In a boro-silica glass composition this temperature is about 815°C. (1500°F.).

After the glass has been heated to the above-described elevated temperature, it is immediately contacted with a liquid quenching agent where heat is exchanged between the surface of the glass and the liquid. A direct measure of this heat exchange for a given temperature difference between the article undergoing quenching and the tempering medium is the heat transfer coefficient. The heat transfer coefficient is defined as the heat transferred per unit time per unit surface area at the glass-tempering medium interface per unit of temperature difference between the heated, immersed glass body and the surrounding medium. For the purposes of this invention, the heat transfer coefficient, $h$, is expressed as British Thermal Units/hour-square foot-degree Fahrenheit (B.T.U./hr.-ft.$^2$-°F) or as calories/second-square centimeter-degree Centigrade (cal/sec-cm$^2$-°C.).

The heat transfer coefficients obtained at the glass-liquid interface using many of the quenching liquids of the prior art do not remain constant with changes in glass temperature during quenching. Generally, after immersing the preheated glass body into the quenching liquid, the heat transfer coefficient rapidly increases as the glass cools in the upper temperature regions of the process. Upon further cooling, the heat transfer coefficient rapidly decreases. This falling off of the heat transfer coefficient with temperature may provide for a relatively low average heat transfer coefficient over the entire temperature range employed in the tempering process and results in a lower degree of temper than expected in the resultant tempered glass article. The degree of temper is particularly poor with thin glass articles quenched in liquids having a heat transfer coefficient that decreases rapidly to a low value prior to the completion of the establishment of permanent stresses due to tempering.

Although liquid quenching has been found to be effective with glass having less thickness than is capable of tempering by air cooling, liquid quenching is frequently accompanied by a large proportion of glass breakage. This breakage is believed to be associated with non-uniform temperature of the different portions of the article when they enter the cooling medium so that the leading edge develops a maximum stress which may cause breakage originating at a surface defect on or near the leading edge. In addition, localized nucleate boiling occurs at surface irregularities in the treated article to produce a non-uniform uncontrollable temper pattern when the article is tempered by dip quenching in liquid.

In tempering thin glass articles, it is particularly important that the quenching medium provide a relatively high average heat transfer coefficient as compared to air over the entire range of temperature employed in the tempering process. With thin glass, heat exchange between the interior of the glass and the surface is appreciably more rapid than with thicker glass. Therefore, in order to achieve as high a degree of temper in thin glass as is obtainable with thicker glass, the heat flux at the glass-tempering medium interface must be proportionately greater for thin glass than for thicker glass. One way of providing a greater heat flux at the glass-liquid interface is to quench in a medium providing a relatively high average heat transfer coefficient as compared to air over the entire temperature range employed in the tempering process.

Belgian Pat. No. 729,055 proposes heating a glass sheet to a temperature as high as 760°C. (1400°F.) followed by a multiple stage cooling technique involving first cooling a heated glass sheet by air blasts to harden the surfaces and cool them to a temperature on the order of 560°C. (1040°F.) to 640°C. (1184°F.) and developing a temperature gradient of 60°C. (108°F.) to 120°C. (216°F.) from the center to each surface followed by more rapid cooling by immersion in a liquid quenching medium. This method requires heating the glass to such an elevated temperature initially that the glass is penetrated by supporting tongs so deeply as to provide poor optics in the regions of tong gripping. Furthermore, in using a liquid quenching medium, it is necessary to remove the liquid before one can use the tempered glass. This removal of liquid usually involves an expensive washing and drying operation.

U.S. Pat. No. 3,764,403 of James E. Neely, Jr., issued Oct. 9, 1973, discloses the application of soft particles of a sublimable solid toward the surface of a glass sheet heated to an elevated temperature sufficient for tempering on sudden chilling to chill the glass surface at a sufficiently rapid rate to impose at least a partial temper thereto. The heat of sublimation is an important element in promoting this rapid cooling that makes possible the tempering of glass sheets as thin as 1.524 mm (.060 inch) and less. The cost of a sublimable material, such as solid carbon dioxide, is greater than that of other materials, such as air and reusable liquids. Therefore, the use of relatively expensive soft particles of a sublimable material after the glass temperature is below the strain point throughout its thickness involves making the cost of thermally tempering thin glass sheets more than is required when less expensive, previously known tempering media are used. However, the fact that soft particles of sublimable material provide higher heat transfer characteristics than air makes it desirable to develop a technique where a sublimable material may be used more efficiently than in the prior art.

Other patents suggest the use of solid carbon dioxide in the quenching of metals. U.S. Pat. No. 2,197,365 to Kjerrman uses solid carbon dioxide in a chilling bath to harden ball bearing parts by quenching. U.S. Pat. No. 3,184,349 to Burwen circulates air through containers of dry ice before applying the chilled air to quench an aluminum article.

It has been found in the practice of tempering glass, particularly glass having a thickness of 2 mm to 3 mm (.08 to .12 inch), the quenching preferably should be done in media which have an average heat transfer coefficient of at least about 0.013 and less than .08 calories/second/sq. cm/°C. (approximately 100 to 600 B.T.U./hr.-ft.$^2$-°F.), as the glass is cooled through the temperature range used in the tempering process. The temperature range used in the tempering process is defined in terms of the surface temperature of the glass from an upper temperature near its softening point down to a lower surface temperature at which the interior of the glass has cooled through the glass strain point. The glass strain point as used herein is that condition in which glass has a viscosity of $10^{14.6}$ poises. When glass has been cooled through the strain point throughout its thickness, the final degree of temper in the glass has been attained.

Quenching with a medium which provides an average heat transfer coefficient below the lower limits specified, i.e., below about 0.013 calories/second-sq. cm.-°C. (100 B.T.U./hr.-ft.$^2$-°F.), is not recommended because of the poor degree of temper which would be obtained in thin glass. Quenching with a medium which provides a heat transfer coefficient of about 0.08 calories/second-sq. cm.-°C. (600 B.T.U./hr.-ft.$^2$-°F.) is not recommended for use with glass articles, since the high rate of cooling develops an initial instantaneous surface tension which is too great and would fracture the glass during tempering.

Besides quenching with a tempering medium which provides an average heat transfer coefficient at the glass-tempering medium interface within the above-specified limits, it is also important to use a quenching medium that provides sufficient heat transfer coefficient to maintain the mid-point to surface temperature gradients as the glass is cooled through the lower temperature regions of the tempering process. These lower temperature regions are defined as having an upper limit where the glass surface temperature is near its strain point and a lower limit where the glass surface temperature is when the interior regions of the glass pass through the strain point.

It has been established that soft, solid sublimable particles of carbon dioxide provide a heat transfer coefficient in the desired range when applied below the sublimation temperature so that the heat of sublimation is used to chill the glass during tempering. However, the use of this material is expensive. Hence, its use is not justified except when used to temper exceedingly thin glass sheets not capable of tempering by air blasts.

SUMMARY OF THE INVENTION

The present invention involves an economical method of tempering a solid article comprising heating the article to an elevated temperature range sufficient for tempering and initially cooling said article from said temperature range by applying streams of soft, small particles of a sublimable solid having a sublimation temperature sufficiently below said temperature range, to induce a temper in the article. The streams may be applied as carbon dioxide snow carried by carbon dioxide gas or carbon dioxide snow mixed with air blasts. The initial cooling using a composition containing solid sublimable carbon dioxide continues until the temperature throughout the thickness of the article is below the strain point of glass. Other cooling media such as air or liquid tempering media are used to continue to cool the article to a temperature sufficiently low for handling at a rate sufficient to avoid losing the temper established by the initial fast cooling.

Air jets from circular nozzles applied too strongly against glass surfaces softened by heat to a viscosity range of $10^{10}$ to $10^{12}$ poises tend to distort the glass surfaces. A practical maximum heat transfer coefficient that such air jets produce without harming the glass surfaces unduly during rapid cooling incidental to tempering is below 100 B.T.U./hr.-ft.$^2$-°F. (approximately 0.013 calories/second-cm$^2$-°C.). According to the present invention, the glass is initially cooled by a composition containing sufficient carbon dioxide in the form of soft, solid, sublimable particles to provide a heat transfer coefficient of at least approximately 100 B.T.U./hr.-ft.$^2$-°F. (approximately 0.013 calories/second-cm.$^2$-°C.) until the glass surface is hardened sufficiently to withstand strong air blasts that complete the cooling of the glass.

The preferred embodiment of the present invention provides a multi-stage cooling method initially using a cooling composition containing a sublimable material having a heat transfer coefficient greater than that of air throughout the temperature range associated with thermal tempering followed immediately by using a material, such as air, that is less expensive than the first material for completing the cooling to handling temperature.

The present invention will be understood a little more clearly in the light of the description of tempering apparatus capable of performing the method of the present invention which follows.

BRIEF DESCRIPTION OF THE DRAWINGS

In the drawings of apparatus capable of performing the present invention and wherein like reference numbers refer to like structural elements.

FIG. 3 is a plan view of the apparatus shown in FIGS. 1 and 2;

FIG. 4 is an enlarged view of a spider type manifold forming part of a delivery system for soft, sublimable particles of carbon dioxide in said apparatus; and FIG. 5 is a cross-section taken along the lines 5—5 of FIG. 4.

DESCRIPTION OF THE PREFERRED EMBODIMENT

Figure 1:
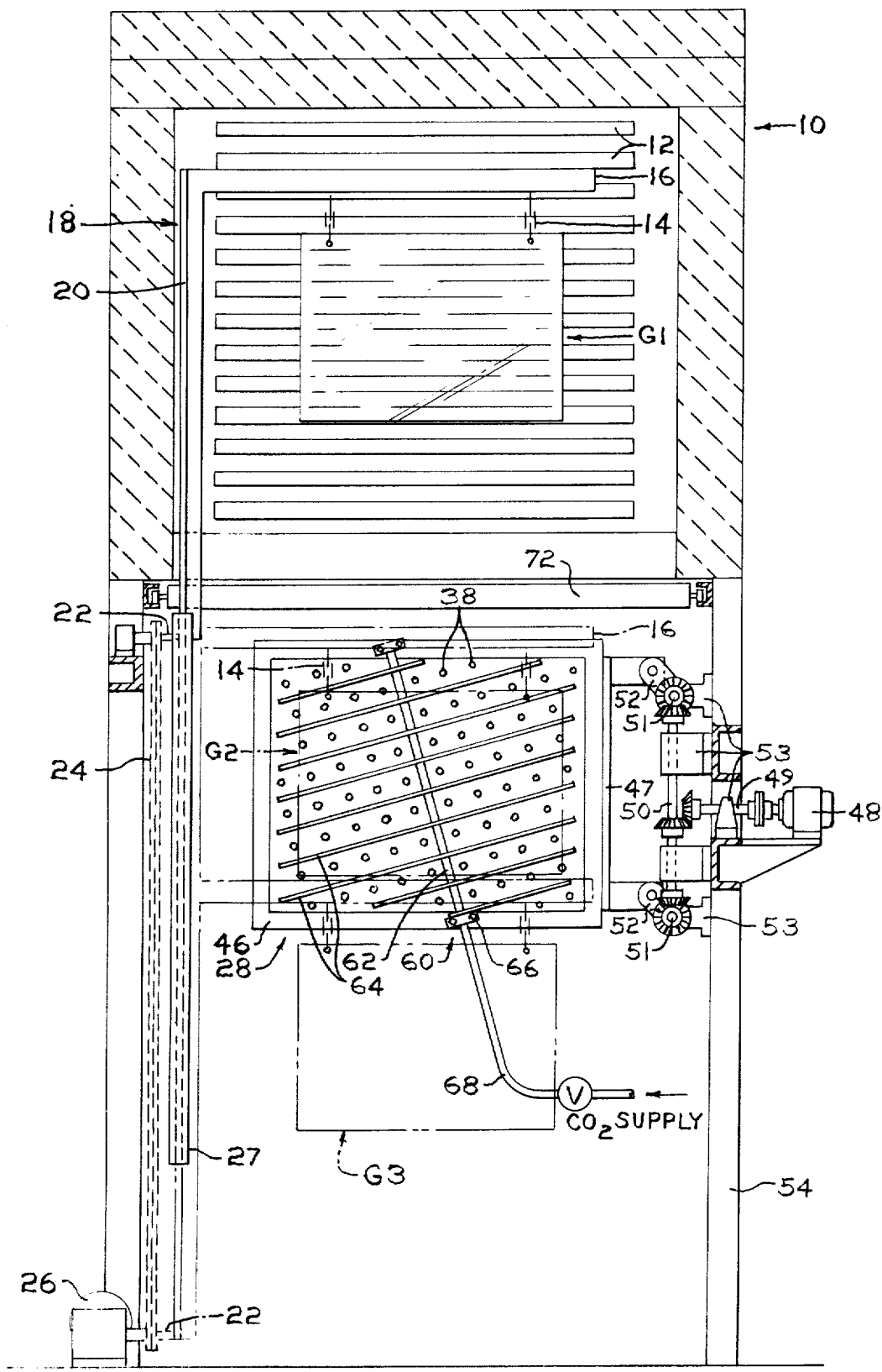
FIG. 1 is a side view partially in section of a preferred embodiment of glass tempering apparatus used to perform the method of the present invention.
Figure 2:
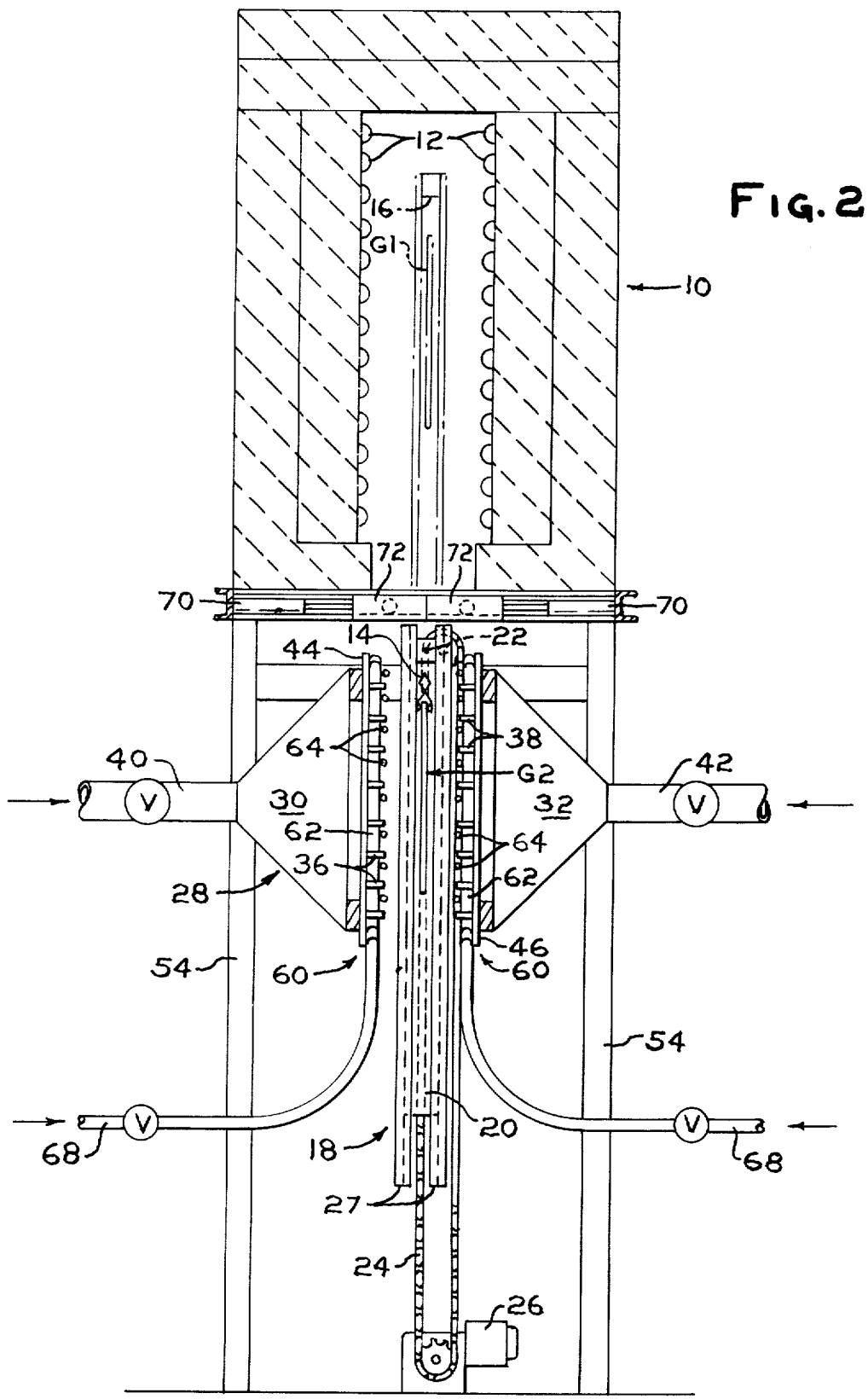
FIG. 2 is a view taken at right angles to FIG. 1 with certain parts omitted to show further details of said apparatus.

A typical embodiment of the present invention comprises a furnace 10 having conventional electrical heating elements 12 disposed along the side walls thereof and a glass sheet G suspended from self-closing tongs 14. The latter are supported on an overhead bar 16 of a vertically movable carriage 18. The carriage 18 also includes a vertical member 20, the bottom of which is connected by means of a connecting lug 22 to an elevator drive mechanism 24. The latter in turn is drivingly connected to a reversible drive motor 26. The position of the vertical member 20 is controlled between a pair of vertical guides 27, which are spaced apart sufficiently to receive the connecting lug 22 therebetween. The elevator drive mechanism 24 is constructed and arranged so that the carriage 18 is movable between a position within the furnace 10 where it supports the glass sheet in an upper glass position G1 within the furnace, an intermediate glass position G2 within a cooling station 28, and a lower glass position G3 below the cooling station 28 where the glass may be loaded or unloaded.

The cooling station 28 comprises a pair of air plenum chambers 30 and 32 disposed on opposite sides of the position G2 occupied by the glass sheet at the cooling station 28. Each air plenum chamber is formed of lightweight metal such as aluminum or stainless steel and has a vertically extending apertured wall at the inner side of an inwardly diverging box. The apertured wall of one air plenum chamber faces the apertured wall of the opposite air plenum chamber. Into each aperture of each apertured wall, there is disposed a nozzle 36 or 38 respectively. Each air plenum chamber 30 and 32 is connected to a source of pressurized air through a flexible air supply duct 40 and 42, respectively. The apertures in each apertured wall are arranged in a rectangular pattern disposed at an angle of 15° to the vertical. The distance between nozzles in each oblique row is 1½ inches (50.8 mm) from the apertured wall. Each nozzle has an inner diameter of approximately 3/16 inch (4.76 mm). A reinforcement structure 44 surrounds the wall of plenum chamber 30 and a similar reinforcement structure 46 surrounds the wall of a second plenum chamber 32. Both reinforcement structures 44 and 46 are connected in cantilever fashion to a common frame 47 (FIGS. 1 and 3). The latter is sufficiently large to provide clearance for the glass sheet and its supporting carriage 18 to move vertically.

Means included to provide relative motion of the air plenums 30 and 32 in unison relative to a glass sheet supported therebetween for cooling at glass sheet position G2 comprises an orbital motion drive motor 48 connected through a main horizontal drive shaft 49 through bevel gears to a vertical drive shaft 50, and a pair of horizontal drive shafts 51 each provided with a pair of spaced eccentrics 52 for driving the common frame 47 in a circular orbital path. Pillow blocks 53 fixed to a main support structure 54 fix the position of the respective drive shafts 49, 50 and 51 to insure that the orbital motion imparted to common frame 47 is repeated in the same path for every orbit. The eccentrics 52 are constructed to provide an orbital diameter of 1.5 inches (38.1 mm), which is equal to the spacing between blasts imparted through the nozzles 36 and 38 of the respective plenum chambers 30 and 32, so that moving air blasts travel over the entire area of the opposite surfaces of the glass sheet during the cooling step.

Reinforcement structure 46 is pivotally mounted on common frame 47 to permit easy access to the faces of the plenum chambers 30 and 32 wherever needed or desired.

Each air plenum chamber is also adapted to support a spider type manifold 60. This latter manifold comprises a main supply pipe 62 communicating with a series of equally spaced apertured pipes 64 having small apertures 65 therein extending substantially parallel to the nozzles 36 and 38. The pipes 64 extend perpendicularly from the main supply pipe 62 to opposite sides thereof. Brackets 66 are provided to attach the ends of the main supply pipe 62 to an extended marginal portion of the apertured wall of the respective air plenum chamber 30 or 32. The main supply pipe 62 communicates through a flexible supply line 68 of material such as a wire reinforced rubber covered hose (such as those sold by Imperial Eastman under the designation J–408) to a source of refrigerated carbon dioxide through a valve. A valve is also supplied in each of the air supply ducts 40 and 42. The main supply pipe 62 has an inner diameter of ⅜ inch (about 9.5 mm) and the apertured pipes have an outer diameter of 3/16 inch to fit into the main supply pipe and an inner diameter of 0.117 inch (about 3.0 mm) and their apertures 65 have a diameter of 0.02 inch (about 0.5 mm) and are spaced every 1.5 inch (38.1 mm) of the length of each pipe 64. Pipes 64 are arranged so that apertures 65 are interspersed among the nozzles 36 or 38.

The apparatus may also be provided with door opening and closing means 70 operatively associated with a horizontally movable sliding door 72 aligned with a slot type opening in the floor of the furnace 10. The main support structure 54 also provides support for the furnace 10 above the cooling station 28.

In a typical operation according to the present invention, a glass sheet is loaded into a pair of self-closing tongs 14 while the elevator drive mechanism 24 has carriage 18 in a lowered position. The carriage 18 is then raised into the furnace 10 so that the glass sheet is exposed directly to the heat of the electric heating coils 12 for a time sufficient to raise the temperature of the glass to a desired elevated temperature (approximately 1200°F. or 650°C.). When this is obtained, the door operator means 70 opens the door 72 thereby enabling the glass sheet to be lowered through the slot opening at the bottom of furnace 10 into position G2 intermediate the two air plenum chambers 30 and 32. The orbital motion drive motor 48 operates to impart a closed circular orbital motion to the air plenum chambers 30 and 32 and to the attached spiders 60. At this time, air under pressure may be imparted through the nozzles 36 and 38 against the opposite surfaces of a hot glass sheet to be tempered and the glass may be chilled by impingment with soft dry particles of solid carbon dioxide which are imparted through the nozzle openings in the apertured pipes 64 as motion is imparted to the common frame 47 and the various air and solid carbon dioxide particle delivery systems attached thereto as may be desired.

According to the preferred embodiment of the present invention only the carbon dioxide supply lines are open initially so that solid sublimable particles of carbon dioxide which do not harm the glass but which provide a heat exchange relationship sufficient to impart a temper in the glass is imparted for a sufficient time to cause the glass to develop a temper. When the glass has been cooled sufficiently for its mid-plane temperature to drop to below the strain point of the glass, the valve controlling the flow of carbon dioxide through the carbon dioxide supply lines 68 and main supply pipes 62 is stopped and the valves controlling the operation of air through the air supply ducts 40 and 42 are actuated to start the delivery of air blasts. The orbital motion drive motor 48 operates throughout the cooling step so that there is relative movement between the streams of quenching medium and the surfaces of the glass.

It is also possible and in certain cases desirable to apply both the soft, sublimable particles and the air blasts simultaneously. The frequency of orbital cycles at which the motor 48 moves the air plenum chambers 30 and 32 and the spider type manifolds 60 is preferably made as high as possible. However, good results were obtained with the apparatus set for 52 cycles per minute.

The following experiments to temper glass sheets 30.48 cm.$^2$ were performed using a furnace to heat the glass sheets to about 650°C. (1200°F.) and a cooling zone. The cooling zone included opposed, spaced spider type manifolds comprising carbon dioxide supply pipes having orifices 0.020 inch (.508 mm) in diameter arranged in a network of squares whose length was 1.5 inches (3.81 cm) from corner to corner. The orifices were disposed on opposite sides of the glass at a one inch (2.54 cm) distance from the opposite glass surfaces. Spaced, opposed sets of nozzles were also disposed in nozzle arrays 1½ inch (3.81 cm) square with one inch nozzle to glass distance and the air nozzles had a diameter of 3/16 inch (4.76 mm) facing the glass. The cooling apparatus was arranged so that a heated glass sheet on leaving the furnace could be chilled by solid, sublimable particles of carbon dioxide, by air blasts in sequence or in unison. The apparatus developed for these experiments in the invention of Robert A. Stewart and forms the subject matter of a copending patent application.

The experiments were performed with various sheets of float glass and sheet glass of various thicknesses using air or solid sublimable soft particles of carbon dioxide snow or a combination of the snow application followed by air blasts to cool the glass. In all instances, a stress measuring instrument identified as a DSR refractometer in an article by R. W. Ansevin entitled "The Non-Destructive Measurements of Surface Stresses in Glass" published in ISA Transaction, volume 4, number 4, October 1965, was used to obtain the surface stress measurement of each glass sheet so produced.

The following tables show the effect of quenching heated glass using only air blasts or only sublimable carbon dioxide particles or a combination of soft solid, sublimable carbon dioxide particles followed by air blasts. In each instance, the glass sheet was heated to approximately 1200°F. (approximately 650°C.) and then subjected to the single stage or multiple stage cooling. Table I records the number of seconds that the glass was subjected to sublimable carbon dioxide particle cooling if applied and whether the cooling included air blasts. In each instance where air blasts were included in the cooling stage, the pressure of the air blasts was 20 ounces per square inch (approximately 0.088 Kg/cm$^2$) and the pressure of the carbon dioxide stored in a pressurized tank was 300 pounds per square inch (approximately 21 Kg/cm$^2$).

Solid carbon dioxide was supplied from a 1000 pound capacity tank of liquid carbon dioxide maintained at a vapor pressure of about 300 pounds per square inch (21 Kg/cm$^2$) and a tank temperature of about 0°F. (approximately −18°C.). The rate of flow of solid carbon dioxide particles was approximately 2 pounds per second (15 grams per second).

TABLE I

| COMPARISON OF STRESS OBTAINED FROM TWO STAGE QUENCH (CO$_2$ Particles-Air) WITH ONE STAGE QUENCH | | | |
|---|---|---|---|
| Glass Type and Thickness | Seconds CO$_2$ | Air Step | Surface Stress |
| Float 2.4 mm (.095 inch) | None | Yes | 10,500 PSI (750 Kg/cm$^2$) |
| Float 2.4 mm (.095 inch) | 2 | No | 16,000 PSI (1120 Kg/cm$^2$) |
| Float 2.4 mm (.095 inch) | 2 | Yes | 19,500 PSI (1370 Kg/cm$^2$) |
| Float 2.4 mm (.095 inch) | 3 | No | 19,500 PSI (1370 Kg/cm$^2$) |
| Float 2.4 mm (.095 inch) | 3 | Yes | 20,200 PSI (1420 Kg/cm$^2$) |
| Float 2.4 mm (.095 inch) | 4 | No | 20,100 PSI (1410 Kg/cm$^2$) |
| Float 2.4 mm (.095 inch) | 4 | Yes | 20,300 PSI (1430 Kg/cm$^2$) |
| Float 2.4 mm (.095 inch) | 5 | No | 20,300 PSI (1430 Kg/cm$^2$) |
| Float 2.4 mm (.095 inch) | 5 | Yes | 20,500 PSI (1440 Kg/cm$^2$) |
| Sheet 2.3 mm (.093 inch) | 3 | Yes | 20,000 PSI (1410 Kg/cm$^2$) |
| Sheet 2.2 mm (.089 inch) | 3 | Yes | 19,000 PSI (1340 Kg/cm$^2$) |
| Sheet 2.3 mm (.091 inch) | 3 | Yes | 21,200 PSI (1490 Kg/cm$^2$) |
| Float 3 mm (.119 inch) | None | Yes | 13,000 PSI (790 Kg/cm$^2$) |
| Float 3 mm (.119 inch) | 2 | Yes | 20,300 PSI (1430 Kg/cm$^2$) |
| Float 3 mm (.119 inch) | 3 | No | 20,200 PSI (1420 Kg/cm$^2$) |
| Float 3 mm (.119 inch) | 3 | Yes | 22,000 PSI (1550 Kg/cm$^2$) |
| Float 3 mm (.119 inch) | 4 | No | 23,100 PSI (1610 Kg/cm$^2$) |
| Float 3 mm (.119 inch) | 4 | Yes | 23,500 PSI (1640 Kg/cm$^2$) |
| Float 3 mm (.119 inch) | 5 | No | 23,500 PSI (1640 Kg/cm$^2$) |
| Sheet 3 mm (.124 inch) | 4 | Yes | 26,000 PSI (1830 Kg/cm$^2$) |
| Sheet 3 mm (.120 inch) | 4 | Yes | 27,000 PSI (1900 Kg/cm$^2$) |
| Float 5.5 mm (.227 inch) | None | Yes | 19,500 PSI (1370 Kg/cm$^2$) |
| Float 5.5 mm (.227 inch) | 11 | Yes | 32,000 PSI (2180 Kg/cm$^2$) |

The results of the experiments reported in Table I indicate that a multiple stage method involving first applying soft sublimable particles of solid carbon dioxide followed by air blasts produces higher stresses than air blasts alone. Furthermore, there is an optimum time for the duration of the application of the solid carbon dioxide particles before switching to air cooling for different thicknesses and different compositions of glass. Generally, two to three seconds of applying solid sublimable carbon dioxide are sufficient for glass less than 3 millimeters in thickness, particularly glass having a nominal thickness of 2 to 3 millimeters. The expenditure of 50 percent additional solid carbon dioxide does not produce any better results than the subsequent application of air which is much cheaper to use in a second stage. Hence, depending upon the degree of compression stress required, a more economic program involving a two-stage quenching comprising first applying soft solid sublimation particles of carbon dioxide and immediately switching to blasts of air once the surface stress is established is superior to either the application of air all the way and much more economical than the continuous application of solid sublimable particles of carbon dioxide.

In the experiments reported in Table II, glass sheets of various thicknesses were heated to approximately 1200°F. in the furnace and subjected to air blasts or air blasts that were mixed with a metered amount of solid, sublimable carbon dioxide particles applied to each of the opposite surfaces of the glass sheet approximately 30.48 centimeters square (12 inches square) for the times indicated. The results indicated the desirability of introducing carbon dioxide as a chilling medium in combination with air blasts used in the initial stages to quench glass sheets. In all the experiments reported in Table II, the glass was clear float having a nominal thickness of 3 millimeters (0.116 to 0.127 inches). The quench pressure was 20 ounces of air per square inch (approximately 0.088 kilograms per square centimeter) and the approximate rate of carbon dioxide applied was 2 pounds per second (0.015 kilograms per second) per square foot of glass cooled.

the glass surface compared to the compression stress obtained from quenching exclusively with air blasts.

Attempts were made to temper glass sheets by a sequential cooling method involving first applying air blasts without any solid sublimable particles for sufficient time to impart at least a partial temper to the glass followed by the application of solid sublimable carbon dioxide particles without air blasts. The incidence of breakage was high. Furthermore, the surface compression stresses obtained were not significantly better than those reported in Table I for the surface compression stress developed in glass sheet by air alone.

It is evident from the reported experiments that the tempering of glass by soft sublimable particles of carbon dioxide may be performed to provide better results than those obtained by air blasts alone when the application of soft sublimable particles with or without a mixture of air is begun in the early stages only when the glass is at the upper portion of the temperature range suitable for tempering. However, if glass is cooled to a temperature near or below the strain point before soft sublimable carbon dioxide particles are applied, breakage of the glass may occur or the higher heat transfer rate of carbon dioxide compared to that of air is not used efficiently.

The subject matter recited hereinbefore describes an illustrative preferred embodiment of the present invention. It is understood that various changes such as providing a horizontal rather than a vertical path of flow for sheets undergoing treatment, changing the rate and/or direction of flow of the tempering media, the arrangement of the means for imparting the tempering media, and the like, may be made without departing from the spirit of the invention as defined in the claimed subject matter which follows.

We claim:

1. In the method of tempering a glass sheet comprising heating said sheet to an elevated temperature range sufficiently high to impart a temper thereto on sudden chilling and applying cooling means sufficiently rapidly toward the surface of said glass sheet while at said elevated temperature range to produce at least a partial

TABLE II

| | COMPARISON OF STRESS OBTAINED USING AIR BLASTS AND BLASTS OF AIR - CO$_2$ MIXTURES TO COOL GLASS | | | | |
|---|---|---|---|---|---|
| THICKNESS (INCH) | QUENCH PRESSURE (OZ/SQ. IN) | RATE OF ADDING CO$_2$ (POUNDS PER MINUTE) | DURATION OF CO$_2$ APPLICATION | EXIT TEMP (°F) | SURFACE STRESS PSI (Kg/cm²) |
| .122 | 20 | — | — | 1195 | 12,600 (885) |
| .121 | 20 | — | — | 1195 | 12,800 (900) |
| .121 | 20 | — | — | 1205 | 12,400 (870) |
| .121 | 20 | — | — | 1205 | 12,500 (880) |
| .116 | 20 | — | — | 1195 | 14,400 (1010) |
| .118 | 20 | — | — | 1195 | 14,000 (985) |
| .123 | 25 | — | — | 1210 | 14,900 (1050) |
| Float .117 | 20 | 10 | 5 sec. | 1205 | 20,400 (1435) |
| .119 | 20 | 10 | 5 sec. | 1205 | 19,500 (1370) |
| .124 | 20 | 10 | 4 sec. | 1195 | 20,000 (1410) |
| .124 | 20 | 10 | 4 sec. | 1200 | 21,000 (1480) |

For those glass sheets that were initially cooled with a mixture of solid sublimable particles of carbon dioxide and air blasts, cooling was continued after the application of solid particles of carbon dioxide stopped, using air blasts at the pressure indicated until the glass was sufficiently cool for handling. The results of the experiments performed in Table II indicate that the application of soft sublimable particles of carbon dioxide mixed with air also improves the compression stress at temper in said glass sheet, the improvement comprising applying toward said glass sheet a cooling medium containing soft particles of a sublimable solid material having a sublimation temperature below the strain point of the glass and capable of sublimation on contact with a hot surface while said glass sheet is within said elevated temperature range and said soft particles are at a temperature not exceeding the temperature of sublimation of said material at a rate sufficient to develop a heat transfer coefficient of at least 100 British thermal units per hour per square foot per degree Fahrenheit at said heated surface to develop a compressive stress in the surface portion of the glass, and continuing to cool the glass by applying another cooling medium free of soft, sublimable particles.

2. The improvement as in claim 1, including discontinuing the application of said soft particles and immediately thereafter applying said other cooling medium to said glass surface.

3. The improvement as in claim 1, wherein the sublimable solid material is carbon dioxide.

4. The improvement as in claim 1, wherein the other chilling medium is air.

5. The improvement as in claim 1, wherein the soft, sublimable particles are applied in a cooling medium containing air blasts.

6. The improvement as in claim 1, wherein said soft, sublimable solid particles are applied until the glass is cooled to below its strain point at its mid-plane in an environment cooler than the glass temperature.

7. The improvement as in claim 6, wherein cooling is continued by air blasts in the absence of said soft, solid, sublimable particles.

* * * * *